US011012758B2

(12) United States Patent
Lieberman et al.

(10) Patent No.: US 11,012,758 B2
(45) Date of Patent: May 18, 2021

(54) CROSS-CHANNEL DIGITAL AND IOT ADVERTISING TRIGGERED BY CABLE TV CUE MESSAGE

(71) Applicant: Viamedia, Inc., Lexington, KY (US)

(72) Inventors: Mark Lieberman, Thornwood, NY (US); Randy Lykes, Lexington, KY (US); Thomas Michael Walsh, Yorktown Heights, NY (US)

(73) Assignee: Viamedia, Inc., Lexington, KY (US)

( * ) Notice: Subject to any disclaimer, the term of this patent is extended or adjusted under 35 U.S.C. 154(b) by 101 days.

(21) Appl. No.: 16/449,291

(22) Filed: Jun. 21, 2019

(65) Prior Publication Data
US 2020/0404390 A1  Dec. 24, 2020

(51) Int. Cl.
*H04N 21/81* (2011.01)
*H04N 21/45* (2011.01)

(52) U.S. Cl.
CPC ....... *H04N 21/812* (2013.01); *H04N 21/4516* (2013.01); *H04N 21/4524* (2013.01)

(58) Field of Classification Search
CPC ............. H04N 21/812; H04N 21/4516; H04N 21/4524
See application file for complete search history.

(56) References Cited

U.S. PATENT DOCUMENTS

| 8,738,787 | B2 | 5/2014 | Cobb et al. | |
|---|---|---|---|---|
| 2014/0195358 | A1* | 7/2014 | Beining | H04N 21/4627 705/14.73 |
| 2015/0249869 | A1* | 9/2015 | Dhruv | H04N 21/26258 725/32 |
| 2018/0255331 | A1 | 9/2018 | McLean et al. | |
| 2019/0007724 | A1* | 1/2019 | Tidwell | H04N 21/812 |
| 2019/0122659 | A1 | 4/2019 | Miller et al. | |
| 2020/0204838 | A1* | 6/2020 | Badawiyeh | H04N 21/251 |

OTHER PUBLICATIONS

Digital Program Insertion Cueing Message for Cable, SCTE 35 Standard, Society of Cable Telecommunications Engineers (2016), pp. 1-73.
Video Ad Serving Template (VAST), Ver. 4.0, Interactive Advertising Bureau (2016), pp. 1-74.
Digital Video In-Stream Ad Format Guidelines, Interactive Advertising Bureau (2016), pp. 1-23.

* cited by examiner

*Primary Examiner* — Chenea Davis
(74) *Attorney, Agent, or Firm* — Dergosits & Noah LLP

(57) ABSTRACT

Digital cross-marketing into digital channels is triggered by a cue message in a linear and non-linear television programming stream. The cue message provides advance warning to a local service provider about an upcoming break in the programming stream and also provides information about the break. In addition to triggering insertion of a local ad into the programming stream in accord with the instructions in the cue message, the cue message also initiates action to run one or more ads in other digital media. For example, the cue message may trigger ads in mobile media, Internet-based media, the Internet of Things, and other media.

23 Claims, 11 Drawing Sheets

CROSS-CHANNEL DIGITAL AND IOT ADVERTISING TRIGGERED BY CABLE TV CUE MESSAGE

TECHNICAL FIELD

This disclosure relates in general to advertising, and more particularly, to triggering cross-marketing efforts into digital media based on the insertion of advertising into a linear or non-linear programming stream.

BACKGROUND

Consumers in a modern digital household have multiple electronic devices, each of which is capable of connection to a service provided through equipment that is controlled by one or more service providers. FIG. 1 illustrates the typical modern home digital environment, with services of various kinds originating at a national or regional level, then delivered to a local distributor, which in turn makes the services available in the home. For example, a television 10 in the home receives broadcasts through set-top box ("STB") 9 installed in the home near the TV, and the STB receives a signal having multiple channels from the local head-end 8 of a cable company, e.g., a multichannel video programming distributor ("MVPD"), which originates from a national or regional MVPD or network source 7. A smartphone 20 is carried by the user and configured to receive cell signals from local cell tower 19, which is a repeater for signals from the source station 18. Internet service is provided to the home through a modem 30, and a router 31 is coupled with the modem and configured to provide a home Wi-Fi network 35. The home Wi-Fi network 35 allows smartphones, tablets and the like to use the Wi-Fi connection rather than the cellular connection to access the Internet, for example. A desktop computer 32 may be hard-wired to the modem 30, e.g., with an Ethernet cable, or it may connect wirelessly through the Wi-Fi network 35.

In addition, controllers are now available for other household systems and devices to connect through the Wi-Fi network, such as heating and cooling systems through a climate control application 36, power and lights through a power control application 37, security (cameras, window sensors, etc.) through a security application 38, etc. Also, Bluetooth technology is incorporated into many digital devices to enable device-to-device IoT communications. The Internet of Things ("IoT") is a concept where any electronic device can be configured to connect to the Internet for the purpose of collecting and sending information, or receiving and acting on information. This information can be programming, messaging or advertising. A consumer example is the "smart home" where most or all electronic devices (computers, appliances, security systems, etc.) are connected to a home network, many for automated operation, and the devices may be monitored and, to some extent, controlled. A commercial example would be an automated building, with feedback from temperature sensors controlling HVAC equipment, cameras monitoring customer movements, among many other examples, with displays for customers to find information, and for employees to monitor and control aspects of the building operation.

As a result of the large digital footprint, many household devices are now incorporating computer-based controllers including display screens and are configured with an user interface to allow some degree of communication between the device controller, the home network and an Internet-based host application, e.g., for communicating and/or responding to security alerts, or trouble signals, or updates, etc.

Thus, the modern consumer has become accustomed to many digital "screens" not only their home environment, but in many locations, such as shopping malls, office buildings, community centers, etc. Further, consumers are regularly exposed to advertising of all forms, not only in their homes on television and the Internet, but in many public locations. While modern marketing efforts are strongly focused on digital channels for advertising, more conventional marketing efforts such as robo-calls are commonly directed to both landline (legacy) and computer-based telephones. Digital marketing efforts can also be explicitly addressed to reach Wi-Fi and Bluetooth-connected devices, and companies such as 4INFO and a4 Media provide tools and analytics related to targeting, delivering and tracking digital advertisements across multiple devices.

Until recently, digital marketing efforts for television programming have been focused on "over-the-top" ("OTT") digital streaming media rather than conventional linear television programming on cable TV networks. This is primarily because many MVPDs utilize different equipment and different communication and/or signal formatting standards, such that it is difficult for digital advertising platforms to interface effectively with the different MVPDs, but also because most of the advertising spots for linear television programming on cable TV networks are reserved for national advertisers, and there are very few opportunities for local cable head-ends to insert ads from local advertisers.

However, applicant's co-pending U.S. application Ser. No. 16/227,160 entitled Integrating Linear TV and Digital Advertising Ecosystems, incorporated herein by reference in its entirety, describes a method for opening up the local ad opportunities in linear television programming to the digital marketplace, based on the detection of a "cue message" in the linear programming stream, which triggers selection of a local ad to insert into the linear programming avail. It would be desirable, however, to extend this concept to have the cue message and the selected television ad initiate a cross-marketing effort into other digital media, such as search engines, social media, smart devices, IoT, and other media.

DETAILED DESCRIPTION

Background: Ad Insertion for Linear Programming

Figure 1:
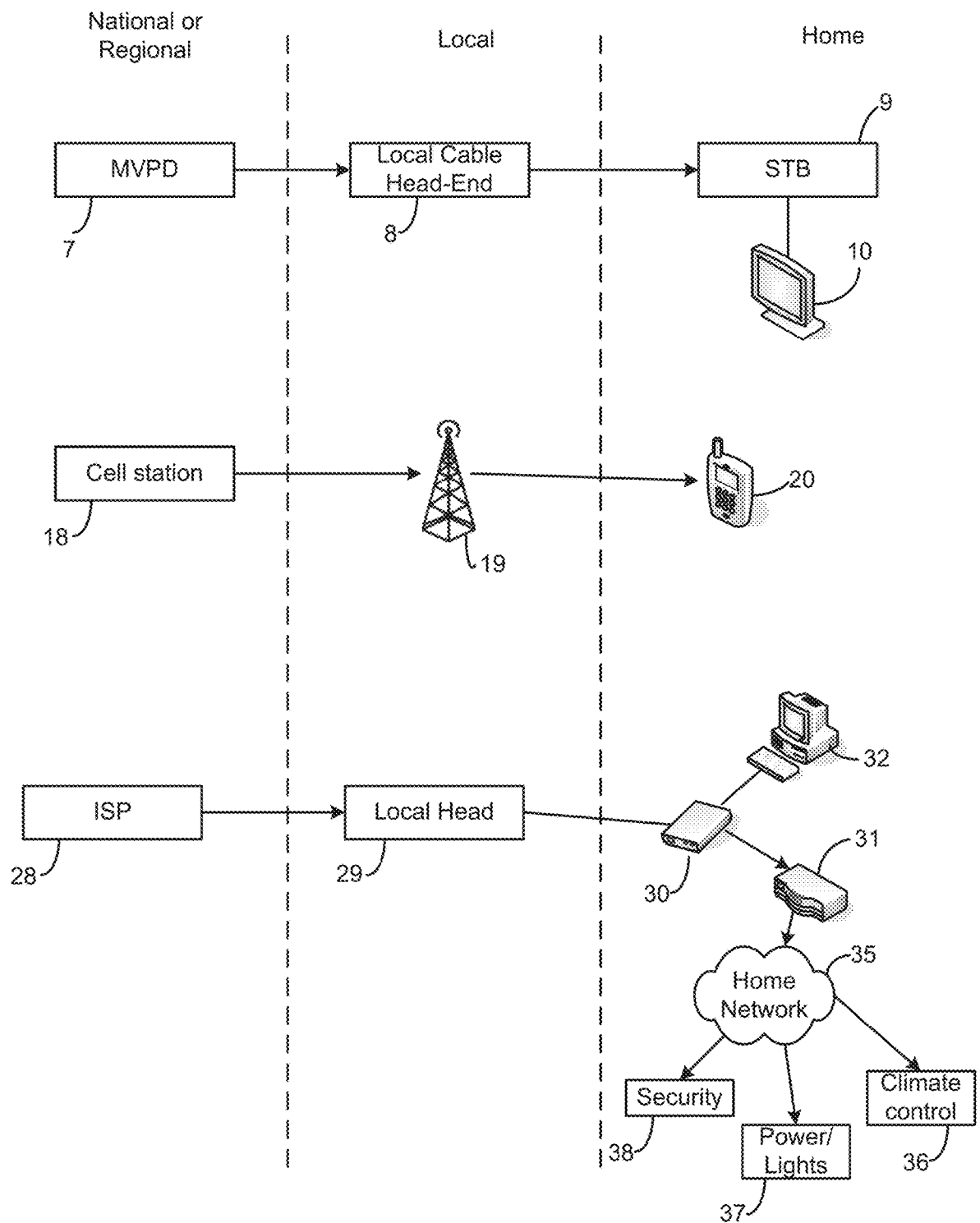
FIG. 1 is a block diagram illustrating a typical digital household environment.

As noted in the Background section above, co-pending U.S. patent application Ser. No. 16/227,160 describes a method for detecting a cue message in a linear television programming feed, and using that cue message to trigger the preparation of a request for a digital ad to be served into the linear programming feed. In this disclosure, however, the cue message will be used to trigger the preparation of one or more requests for other actions in the digital environment, such as cross-marketing and advertising on other digital platforms or networks. The term "ad" is used herein in its broadest sense to refer to any type of information served into the digital environment, whether or not for commercial purposes.

As a preliminary matter, linear programming feeds originate from numerous cable networks, such as ESPN, TNT, CNBC, etc., and are distributed locally by multi-channel video programming distributors ("MVPDs"), such as Charter, Comcast, Altice, Cox, etc., that in turn provide a selection of television channels by subscription to customers through a set top box ("STB") installed at the customer's location. The cable networks identify within each linear programming stream available time slots ("avails") for insertion of local advertising content ("local ads") by the MVPDs, and typically, approximately 2-3 minutes per hour of programming are available to be filled with locally targeted ad content. The selected ad content is inserted by splicing (or video switching) the ad content into the programming stream at the local head-end of each MVPD. This industry is referred to as spot cable advertising.

Linear programming feeds implement a core signaling standard for advertising and distribution control of content, promulgated by The Society of Cable Telecommunications Engineers ("SCTE"), namely SCTE 35, entitled Digital Program Insertion Cueing Message for Cable (2019)(see link: https://www.scte.org/SCTEDocs/Standards/SCTE%2035%202019.pdf). Thus, every linear programming feed includes an SCTE 35 signal embedded into the programming feed to identify ahead of time to the MVPDs advertising breaks, advertising content, and programming content. The SCTE 35 signal is generally referred to as a "cue message" or a "cue" analogous to the cue tone used to signal programming breaks in analog television broadcasts. The SCTE 35 cue message is basically a first data packet having multiple data fields that contain data and metadata that specify relevant criteria for how to fill the avails in the programming feed, and may include basic audience targeting information related to the network and the current program in this programming feed, or a link to such information. Similarly, for digital video advertising, the Interactive Advertising Bureau has set a standard specification for communications between digital ad servers and digital video players called the Video Ad Serving Template ("VAST"), such that any digital video ad served according to the VAST protocol can be played by any digital video player.

Figure 2:
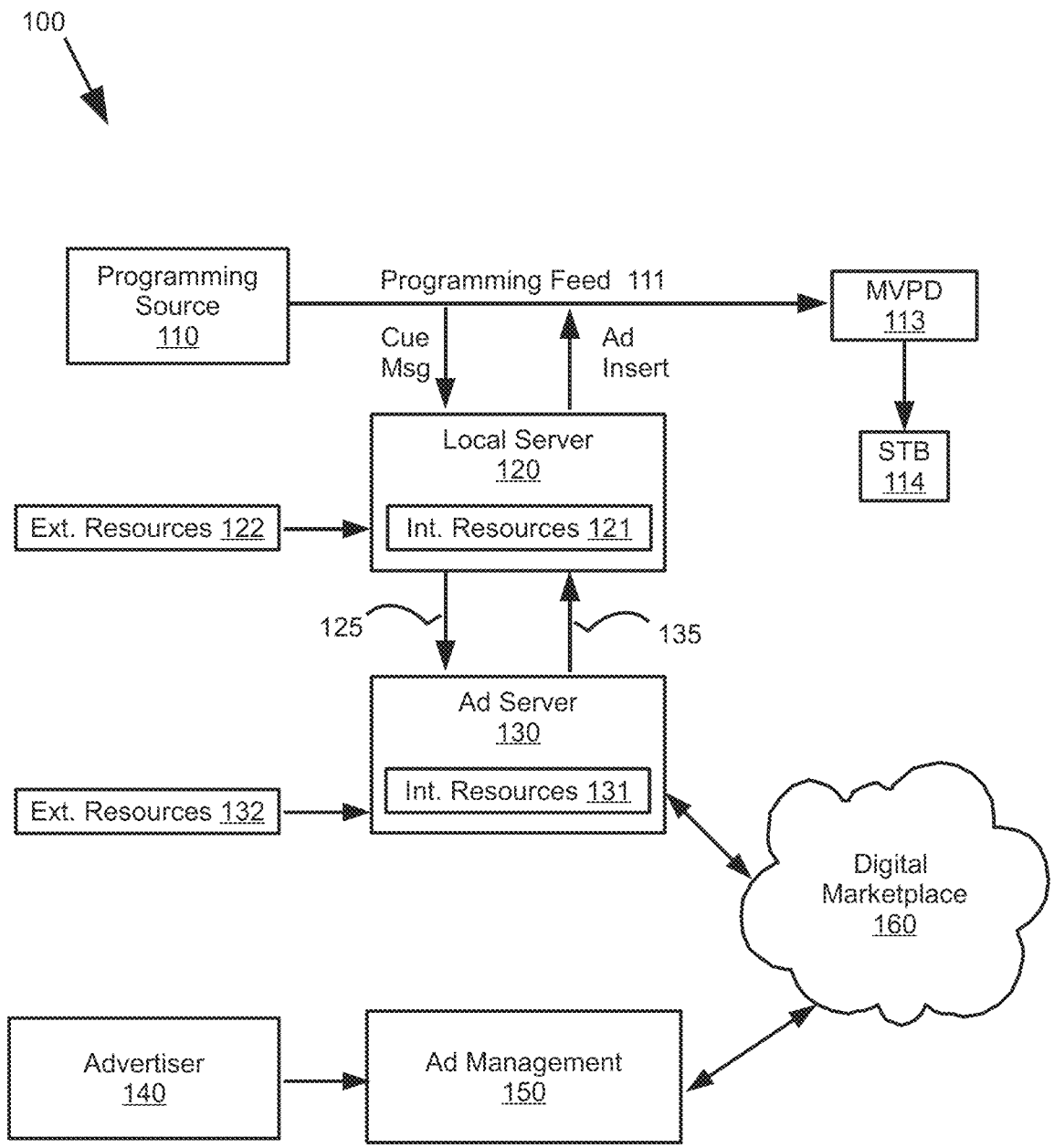
FIG. 2 is a block diagram illustrating a system for inserting ad content into a digital linear programming stream.

FIG. 2 is a simplified illustration of an SCTE 35 compliant ad insertion system 100 for a single linear programming feed distributed to a single customer. A programming source system 110 provides a linear programming feed 111 to MVPD 113, which distributes the programming feed to STB 114 in a customer location. A local server 120 monitors the programming feed in order to detect an SCTE 35 cue message (e.g., a first data packet), and upon detecting the cue message, the local server: (i) prepares an ad request 125 (e.g., a second data packet) using available resources (including as necessary internal resources 121 and/or external resources 122) to add additional targeting or other information to relevant base information from the cue message; and (ii) sends the ad request 125 to an ad serving network 130. The ad request 125 (second data packet) may also include program instructions designed to obtain additional relevant information from the internal resources 121 and/or external resources 122 of the local server 120 and from the internal resources 131 and/or external resources 132 of the ad server 130. For example, instructions may be configured and passed in the ad request 125 for the ad server 130 to obtain information such as: the geolocation of devices that will play the inserted ad; audience context, demographic and psychographic information for ad targeting; the content of the inserted ad; estimated and actual viewer impression data from set top boxes; among others. This additional information can be used for providing ad targeting information specific to a particular advertiser's needs, or for use in selecting a relevant ad, as well as for initiating reporting and billing statements for the advertiser in a separate reporting/billing module 170.

In one embodiment, the ad serving network 130 utilizes the information in the ad request sent by the local server 120, and may utilize its own internal resources 131 and/or external resources 132 (such as relevant databases), to help: (i) select an ad, utilizing the relevant information and criteria, and (ii) prepare and return a response 135 (e.g., a third data packet) to the local server 120, the response either providing the content directly, or more typically, identifying the location of the content (which may exist locally on the same server as the decisioning software or externally on any number of computers throughout a local network or over the internet).

Each advertiser is usually serviced by a third-party ad management provider 150, which interacts with the digital marketplace 160 as well as, when appropriate, the ad server 130. Typically, the ad selection process occurs through real-time bidding in the digital marketplace 160; but sometimes cable TV ad spots are pre-sold and therefore pre-scheduled for ad insertion. In such instance, that scheduling information is passed to the ad server 130 in the request 125 and pre-empts the normal selection process at the ad server. In either event, the local server 120 receives the response 135 from the ad serving network 130 and, at the time as specified in the cue message (or at the location specified in the programming stream), serves the ad by inserting the ad directly into the linear programming stream 111 at the designated time, or causing the ad to be inserted through other related equipment resources, such as an ad splicer.

Trigger for Digital Cross-Marketing

As noted above, in addition to triggering an ad insertion event for linear programming, detection of the cue message in a linear programming feed can be used to trigger other events and actions in digital network-based environments, such as cross-marketing and advertising for local advertisers who benefit from the related linear ad insertions.

Figure 3:
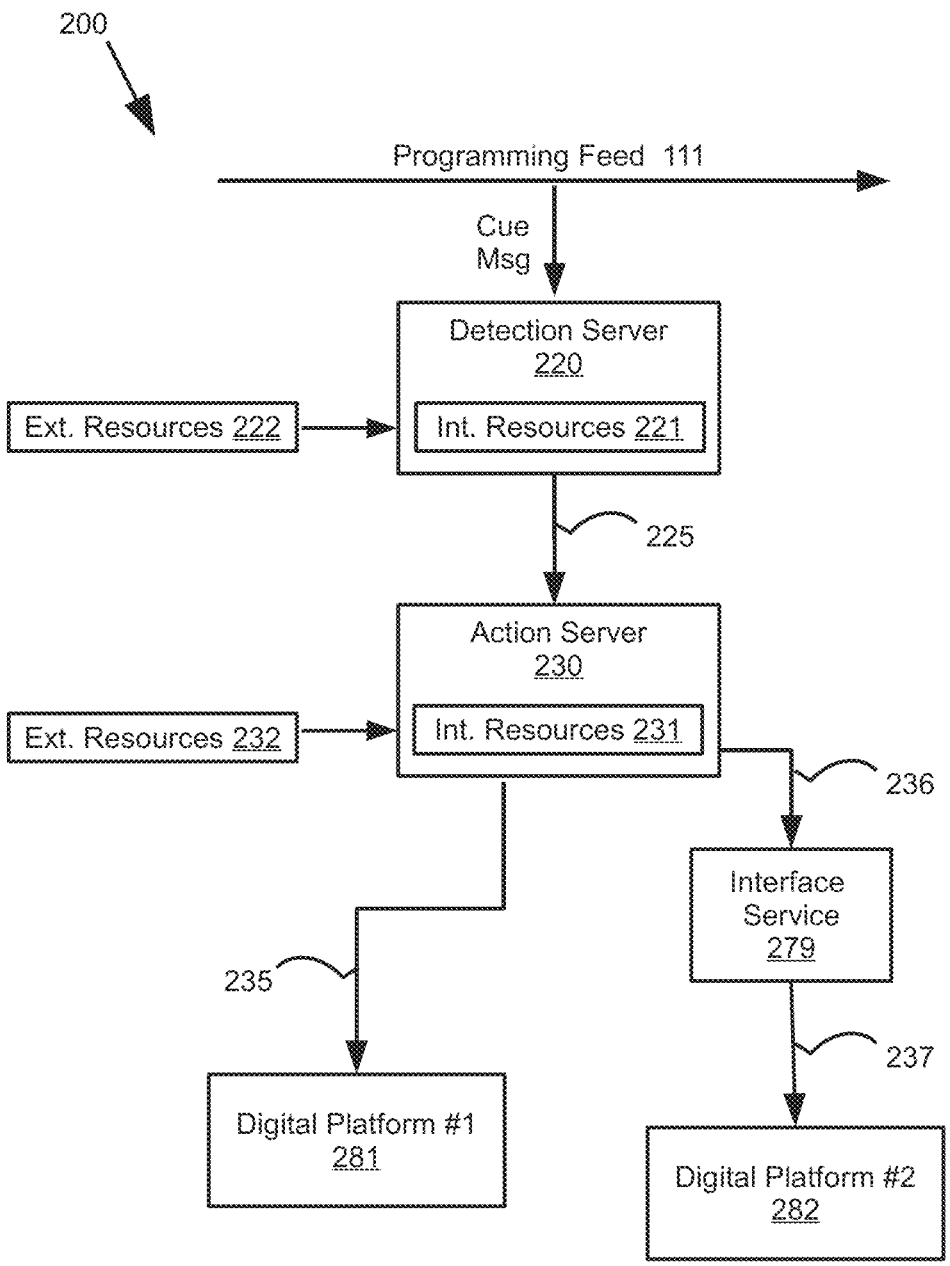
FIG. 3 is a block diagram illustrating a first embodiment of a system for digital cross-marketing based on detection of a cue message in a linear programming stream.

For example, FIG. 3 illustrates one example of a system 200 for initiating actions other than linear ad insertion based upon cue message detection. A cue message in a linear programming stream 111 is detected by a detection server 220, and upon detecting the cue message, the detection server prepares and sends a single request 225 to an action server 230 in order to initiate one or more cross-marketing actions on one or more digital platforms.

The request 225 is prepared by the detection server 220 as a data packet having data and metadata, some of which is obtained from the cue message and put into the request. For example, the cue message generally includes data that identifies the network and the programming content, and may provide links to external data sets that have information about the viewing audience for the programming content, such as demographic and psychographic information. This base information from the cue message and associated data sets can be used to as criteria for selecting an ad or advertiser to promote through the cross-marketing effort, just as it is for considering a linear ad insertion. Additional information, such as more detailed targeting information or advertiser information, may be obtained from internal resources 221 of the detection server 220 or from external resources 222 accessible to the detection server, and may be added to the request 225 to supplement the base information from the cue message, and/or to provide downstream instructions to the action server 230 and/or other devices. Further information, such as the digital channel of interest, and the parameters necessary to access that channel, such as bid criteria, can also be provided in the request 225 when known at the detection server, for example, when provided or linked by advertisers.

Upon receipt of the request 225 from the detection server 220, the action server 230 processes the request and initiates one or more calls for action to other digital networks and/or resources. For example, the action server 230 may be configured for generating a direct request 235 to a first digital platform 281 for ad placement on the platform. In order to prepare the direct request 235 to the first platform 281, the action server 230 processes the original request 225 from the detection server 220 to obtain relevant information and instructions from the request for selecting and serving the requested ad, and also for obtaining other information, e.g., from internal resources 231 of the action server and/or external resources 232 of the action server, such as: additional targeting information; additional information about the advertiser, such as keywords, bid amounts, ad distribution lists (customer contact lists, e.g., email address(es), mobile number(s), etc.); formatting requirements for the specified digital platform; links to ad content, etc.

The action server 230 may also be configured for making an indirect call 236 to a second platform 282 through an intermediate or interface network 279. The interface network 279 is configured as a service to handle and format transactions for the second digital platform 282 through link 237.

Figure 4:
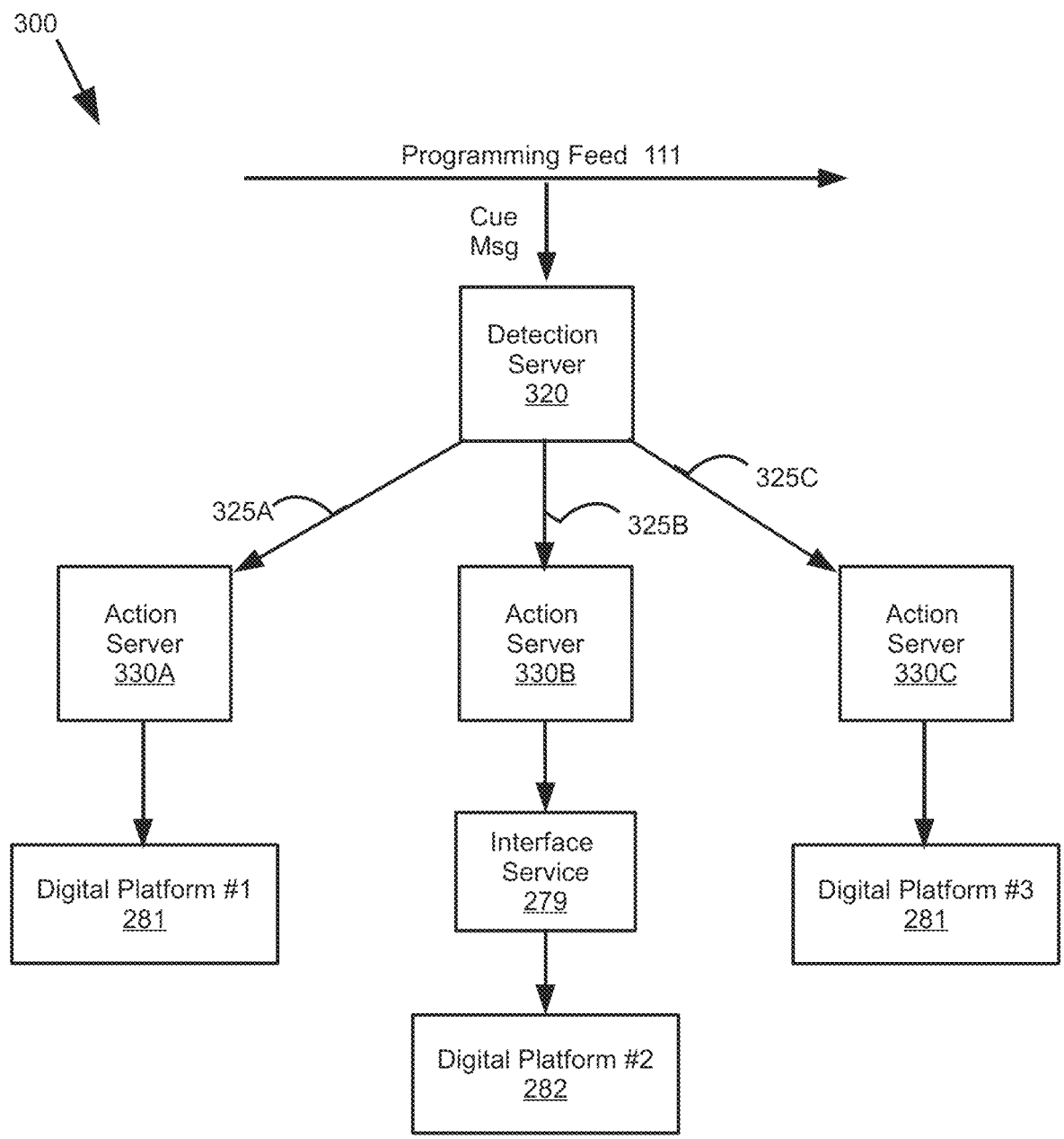
FIG. 4 is a block diagram illustrating a second embodiment of a system for digital cross-marketing based on detection of a cue message in a linear programming stream.

FIG. 4 illustrates an alternative example of a system 300 for initiating actions other than linear ad insertion based upon cue message detection. The cue message is detected by the detection server 320, but in this case, upon detecting the cue message, the detection server prepares and sends a number of individual requests to different action servers. For example, the detection server 320 may be configured to prepare a first request 325A for a first type of action with the first digital platform 281 and send it to a first action server 330A to engage with the first digital platform; to prepare a second request 325B for a second type of action and send it to a second action server 330B for engagement with a second digital platform 282 through an interface network 279; to prepare a third request 325C and send it to a third action server 330C for engagement with a third digital platform 283; and so on.

Figure 5:
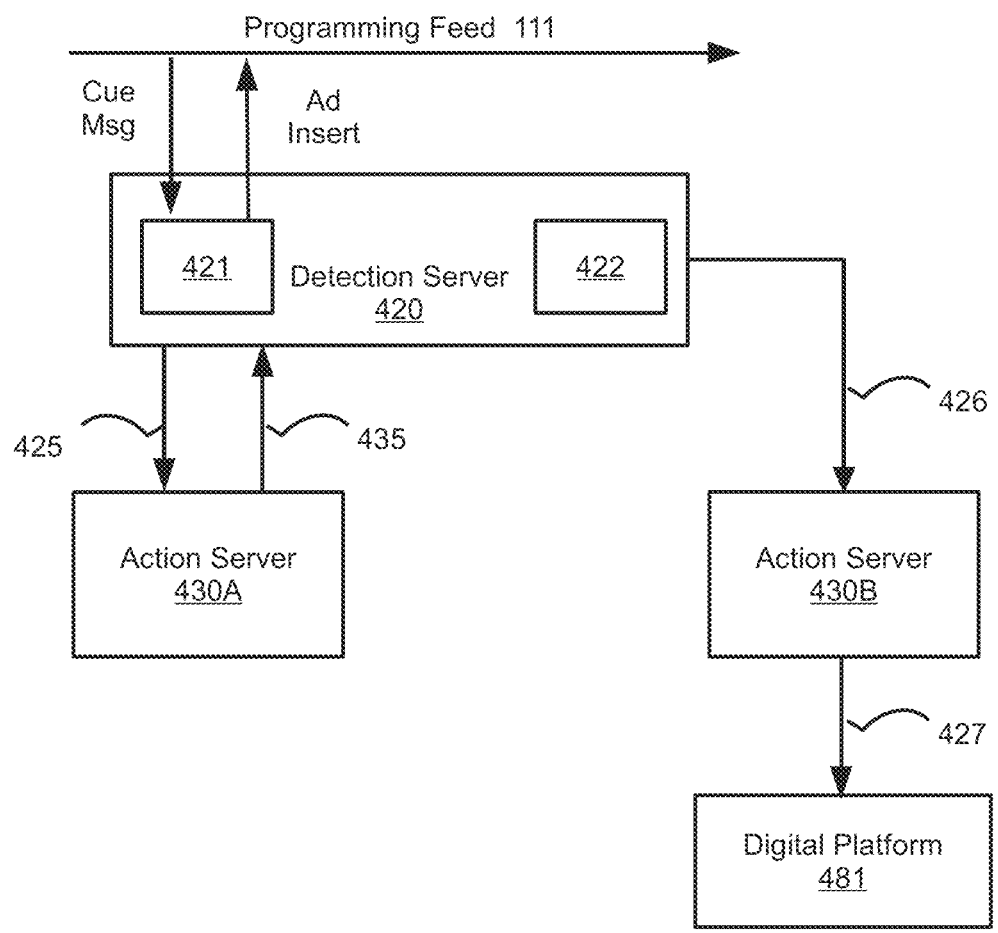
FIG. 5 is a block diagram illustrating a third embodiment of a system for digital cross-marketing based on detection of a cue message in a linear programming stream.

Another example system 400 is illustrated in FIG. 5, where the detection server 420 detects the cue message, and with a first module 421, prepares and sends a first request 425 to the ad server 430A for a digital ad to insert into the linear program. The ad server 430 returns a response 435 for handling the linear ad insertion, but also, the response identifies both the ad content and the advertiser, either directly or through metadata. The detection server 420 ingests this information into a second module 422, which prepares a second request 426 to initiate a cross-marketing effort related to the linear ad insertion in a different marketing channel, for example, by sending a request 427 for action directly (or through an intermediary) to digital platform 481.

The request 426 can now include more detailed information about the advertiser, possible ad content, the advertiser's ad campaigns, keywords, bid amounts, contact lists (email, telephone, etc.). Thus, a local advertiser can contract with the local cable provider to have ad content available for linear ad insertion, and further, the contract can provide that upon a linear ad insertion event, a cross-channel marketing effort will be triggered for the advertiser.

Thus, there are two critical information aspects of a successful cross-marketing campaign: one relates to information about the advertiser and its ad campaign; and the other relates to information about the digital channel—how to acquire the ad space and successfully place ads.

With regard to the advertiser, often they have contracted with an ad management network to maintain a digital presence for the advertiser with Internet-based efforts, such as display ads, search engine ads, social media ads, etc. Further, the ad management network can help to create and store appropriate creatives for different media placements, and provide the content, or a link to the content, upon receiving an authorized request. If the advertiser is a small business handling its own marketing efforts, then more knowledge of the various media interface requirements may be necessary.

In general, each digital channel makes available its application programming interface ("API") or other interface framework available to software developers. The API is a set of tools and defined protocols for building software that can properly interact with that specific channel. The API may impose limits on the text, image size, image aspect ratio, and other aspects of the creative. There are many service providers for digital ad marketing platforms that are well-versed in creating and deploying digital ad campaigns for one or more specified digital channels, including Internet-based campaigns (search engine, display, etc.) and non-Internet-based campaigns (mobile devices, IoT, robo-calls, etc.), such that individual advertisers usually need not develop any expertise in those areas, but instead, may rely upon third-party providers to manage multiple interfaces.

For example, GoogleAds® is one of the most popular providers of online ad space, and allows users to manage their accounts, campaigns, and ads with an open-source, remote procedure call framework, published at the following link: <https://developers.google.com/google-ads/api/reference/rpc/>. Again, advertiser engagement with this type of service is often provided by a third-party service provider on behalf of the advertiser. Similarly, Facebook® provides a number of different APIs for user, including access to its marketing API at the following link: <https://developers.facebook.com/docs/marketing-apis/>. Data collection and interaction with NEST® thermostats and security cameras can be programmed using the Nest API at the following link: <https://developers.nest.com/documentation/api-reference>. Other digital channels have APIs or frameworks as easily accessible.

There have also been significant and fruitful efforts to provide standards and guidance with regard to the digital media ecosystem. The Interactive Advertising Bureau ("IAB") is a non-profit organization comprised of more than 650 leading media and technology companies that provides technical standards, software, and services for selling, delivering, and optimizing digital advertising or marketing campaigns. For example, some of the published IAB technical standards include the Open RTB real-time bidding protocol; the ads.txt anti-fraud specification; Open Measurement SDK for viewability and verification; the VAST video specification; and DigiTrust identity service.

Thus, for the most part, interfacing with the various digital media channels is a basic exercise, well-known to those with ordinary knowledge in those areas, with a need only for providing sufficient information and/or links to identify and select appropriate ads for selected media.

In general, the digital ad serving network 130 illustrated in FIG. 2 is really an implementation of a supply side platform ("SSP"), in that the ad server provides ad space availability in linear program feeds to the SSP, which can be auctioned off in digital marketplace 160 that includes demand side platforms ("DSPs") as well. Thus, the ad server/SSP is inherently configured to seamlessly interface with a variety of digital media in order to place digital content, including ads, when provided with a proper set of instructions, although it could be any type of server-based system. Usually, this means providing the SSP or the third-party platform with the right information so that it can properly serve the desired content to the desired media. The "right information" or key information is dependent upon the media channel, and this requires customers and/or their ad marketing partners to build campaigns that include appropriate variations specific to the desired media channels.

Figure 6:
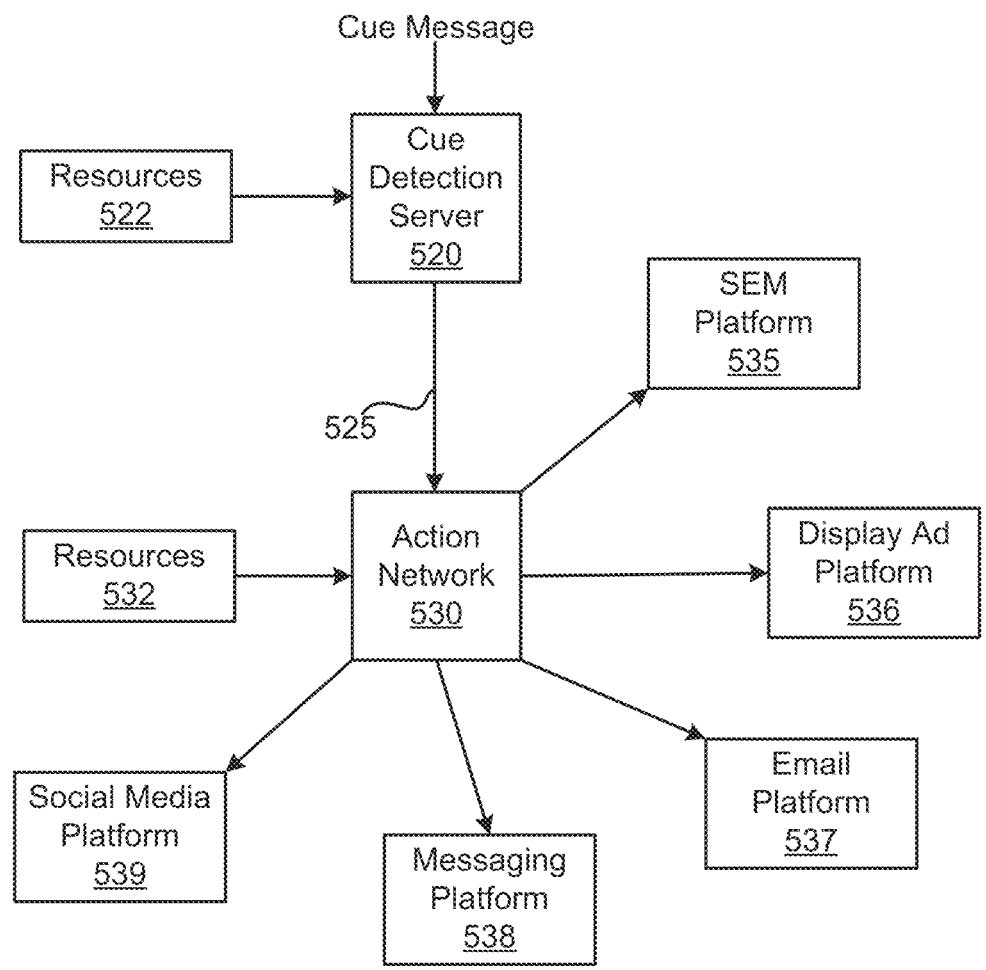
FIG. 6 is a block diagram illustrating various digital platforms served based on detection of a cue message in a linear programming stream.

A first set of cross-marketing applications will be described wherein the cue message is used to trigger further action by the SSP, such as ad placement in other digital channels. FIG. 6 illustrates one embodiment of a cross-marketing system 500 triggered by the cue message. A cue detection server 520 detects the cue message in a linear program stream, and that detection triggers at least one request 525 from the cue detection server to an SSP/action network 530 for a digital cross-marketing effort to be initiated. The request 525 is adequately constructed to include the appropriate information for deployment of an ad creative into one or more digital channels, such as search engines 535, online displays 536, email 537, messaging (text/SMS) 538, social media 539, etc., including passing parameters and related information from the cue message and/or from resources 522 available to the detection server and/or resources 532 available to the action server 530.

Consider an example where a program entitled Bicycle Adventures Through Europe is being broadcast on the National Geographic cable network. During the broadcast, a cue message embedded in the program stream, compliant with SCTE 35, signals an upcoming avail for local content insertion at each and every MVPD that carries the National Geographic network in a defined distribution area. The cue message is a first data packet having data and metadata including the start time and duration (or end time) of the upcoming avail, the network, the title of the program, and may include links to external data sources having information about the viewing audience developed by the network that relates to the network and to the program currently being broadcast. In particular, the name of the show, the identity of the network, and the viewer information are crucial pieces of information that can be used to select and place digital ads for a local advertiser upon detecting the cue message, whether the ad is placed into a linear programming stream or onto one or more digital platforms.

When the local server detects the cue message, it prepares a first request for a local advertiser's content to be inserted into the linear program stream during the upcoming avail, the first request including relevant data and metadata from the cue message, and adding additional targeting criteria as appropriate, then sending the first request to the SSP. However, the cue message could also trigger a cross-marketing effort into another digital channel. The cross-marketing effort could be initiated in response to the first request, but preferably, one or more additional requests are triggered by the cue message and directed to one or more specific digital channels, or to one or more third-party platforms to manage the request and placement. As one example, when the cue message for the National Geographic program is detected, one possible local advertiser that may be selected is Randy's Bikes, a local retailer of bicycles and bicycle tours.

Search Engine Marketing

Paid advertising on search engines, such as Google, Bing, Yahoo!, etc., can allow advertisers to target customers who are specifically looking for a product or service that is offered by the advertiser, based on the customers' search requests and history. For example, an advertiser can enter bids at ad auctions to purchase one or more keywords with one or more search engines, and if any bids are accepted, when those keywords are entered by a user into the search engine, the advertiser's ad will be displayed alongside the search results. Other targeting criteria, such as personalized marketing, can also be employed.

Acceptance of ads by a search engine is typically not solely based on the amount of the maximum bid, but instead, a quality metric is often evaluated as well with regard to the quality and relevance of the ad. For example, GoogleAds determines an Ad Rank as the simple product of Maximum Bid times Quality Score. Thus, advertisers must be cognizant of such factors when building their marketing campaigns.

The important pieces of information required in a request to deploy a companion ad specifically as part of a search engine marketing campaign are (i) the keywords on which to place bids, (ii) the maximum bid per-click for each keyword, and (iii) a link to properly-formatted ad content associated with each keyword. In addition, other key parameters associated with running the ad should be included in the request, such as geolocation for the campaign (e.g., same zip codes/regions as the National Geographic broadcast), duration of the campaign (e.g., 72 hours after the broadcast), landing page for linked inquiries, etc.

Figure 7A:
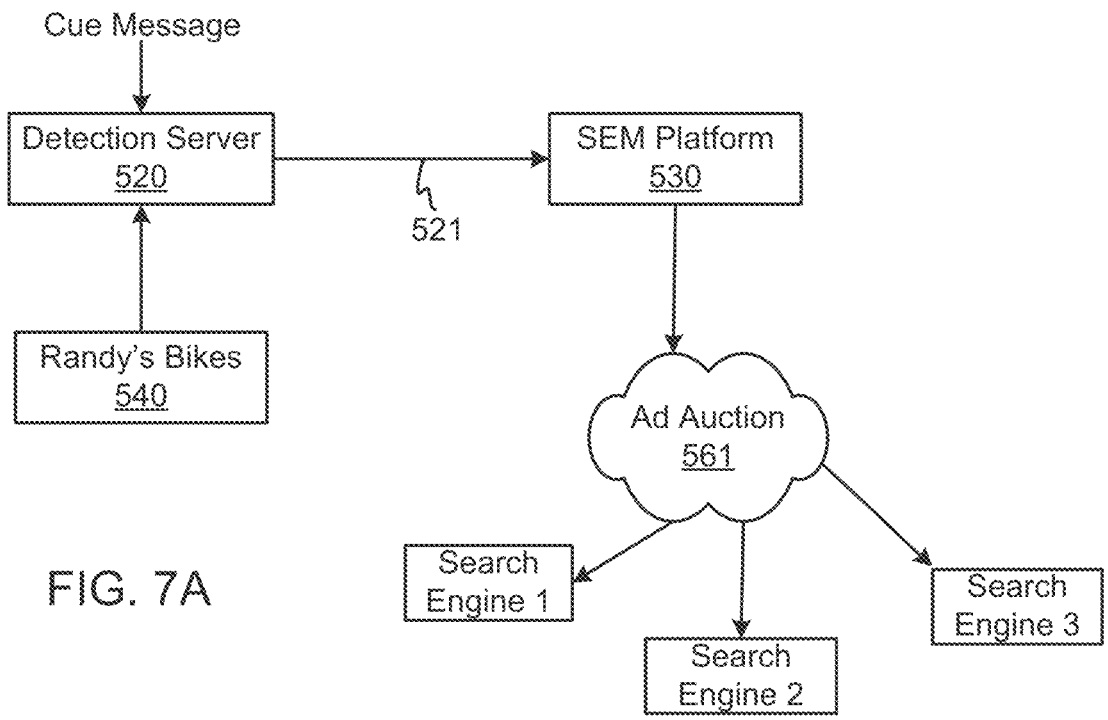
FIG. 7A is a block diagram illustrating a first system embodiment for triggering search engine cross-marketing.

Obviously, Randy's Bikes (or any local advertiser) must provide at least keywords, bids and ad content in order to mount a successful search engine marketing campaign, and that means this information must be prepared ahead of time and stored for easy access. For example, Randy's Bikes could initially arrange its marketing campaign with the local cable company, and provide the key information to the cable company ad department, and an example will be described with reference to FIG. 7A. Further, Randy's Bikes could alternatively arrange its marketing campaign with a service that provides digital ad management, and provide the key information to the ad management service, and an example will be described with reference to FIG. 7B. In FIG. 7A, the cue message in the linear programming feed is detected at the detection server 520. In addition to triggering a linear ad insertion process (not shown here), detection of the cue message at the detection server 520 can initiate a process that results in the generation of a companion ad request 521 by the detection server, which is then sent to a server-based platform 530 that provides search engine marketing services, with the objective of placing one or more ads onto search engine results pages.

In this embodiment, the local advertiser Randy's Bikes 540 has worked directly with the local cable company or its representatives (e.g., detection server 520) to place the ad into the pool of local ads to be inserted, when selected, into the linear programming stream distributed by the local cable company. The ad placement for Randy's Bikes may be initiated upon detecting the cue message in the National Geographic broadcast with detection server 520, and as described previously, selecting the ad for Randy's Bikes.

However, since Randy's Bikes also arranged with the local company for a companion ad to be triggered for local Internet searches related to bicycles or bicycle tours for a period of time after the linear ad insertion ran, the key pieces of information (keywords, bids and ad content) were determined and provided to the detection server, or made available to the detection server as part of the customer information for Randy's Bikes 540. Thus, the request 521 prepared by the detection server 520 and sent to the SEM platform 530 is constructed with multiple fields to include key information, such as: (i) the keywords and/or phrases on which to place bids (e.g., bike, bicycle, bicycle tours, etc.); (ii) the maximum bid per-click for each keyword; (iii) a link to properly-formatted ad content associated with each keyword; (iv) geolocation for the campaign (e.g., within 100 miles of the zip codes for Randy's Bikes); (v) duration of the campaign (72 hours after the broadcast); (vi) landing page for linked inquiries, etc.

The SEM platform 530, having more experience with placing ad creatives for response to Internet searches, is generally familiar with the APIs of the various search engines, and thus will generally review and modify the content as necessary before bidding and placement in order to ensure a seamless placement interface with one or more search engines. When it receives the request 521, the SEM platform 530 enters at least one ad auction 561 for a particular search engine (and may enter multiple auctions for multiple search engines) and submits the keywords and maximum bids for each keyword on behalf of Randy's Bikes. If any of the search engines accepts a bid by Randy's Bikes for a particular keyword, the ad for Randy's Bikes will be displayed next to the search results whenever that keyword is entered into the search engine for the duration specified, and Randy's Bikes will pay the search engine on a per click basis for click-through events on the ad.

Figure 7B:
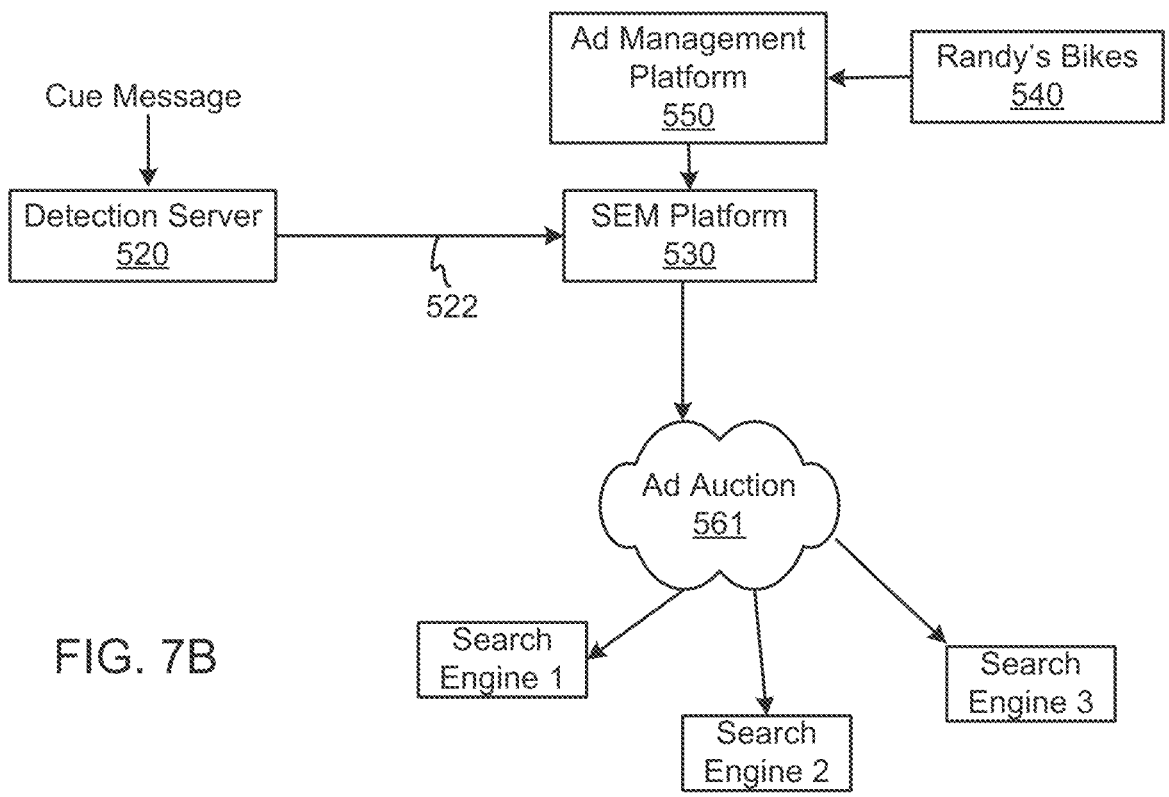
FIG. 7B is a block diagram illustrating a second system embodiment for triggering search engine cross-marketing.

An alternative embodiment is illustrated in FIG. 7B. The cue message is detected at the detection server 520, and in addition to the request for a linear ad insert, a request 522 for preparing a digital companion ad is prepared and sent to the SEM platform 530. However, the companion ad may or may not be the same advertiser as in the linear ad placement. Instead, the companion ad is simply another opportunity for local advertisers to create a connection between the content shown on cable TV and a local user's Internet searches that relate to such content.

In this embodiment, Randy's Bikes 540 has worked with an ad management platform 550 to create and place a digital ad as part of a coordinated campaign. Thus, the key information (keywords, bids, etc.) is provided to or developed with the ad management platform 550, not the detection server 520. The detection server 520 includes a flag in request 522, which when set indicates that a companion ad should be initiated. Upon detecting the cue message, the detection server 520 prepares a request 522, including setting the flag for a companion ad, and including relevant information from the cue message and any additional local targeting information. The SEM platform 550 can act on the request 522 to obtain the key information, and then proceed to the auction 561, as described above.

Display Marketing

Online display ads (often called banners or pop-up ads) can be run alongside native web content. Unlike search engine marketing, a display ad is presented to anyone within a targeted profile or visiting a specified web site. Thus, while search engine marketing places ads next to search results, display ads can be placed across a much broader scope of network sites.

For example, display marketing can target many more aspects of consumer behavior. Keyword targeting serves ads alongside content on websites that contain targeted keywords. Demographic targeting serves ad based on the basic demographic profile of a website or audience. Placement targeting serves ads only to specific website(s). Topic targeting serves ads to a group of websites that fit within a certain topic. Interest targeting serves ads based on the interests of searchers. Audience targeting serves ads to users who have previously visited your website, i.e., remarketing. Geographic targeting serves ads based on defined geographic elements, including common elements such as zip codes, cities, or states, designated market areas (Nielsen Company DMA Regions), or more sophisticated elements, such as a radius drawn around a map point or a polygon drawn on a map, or a metadata tag used to authenticate a device to its associated residential address.

Figure 8A:
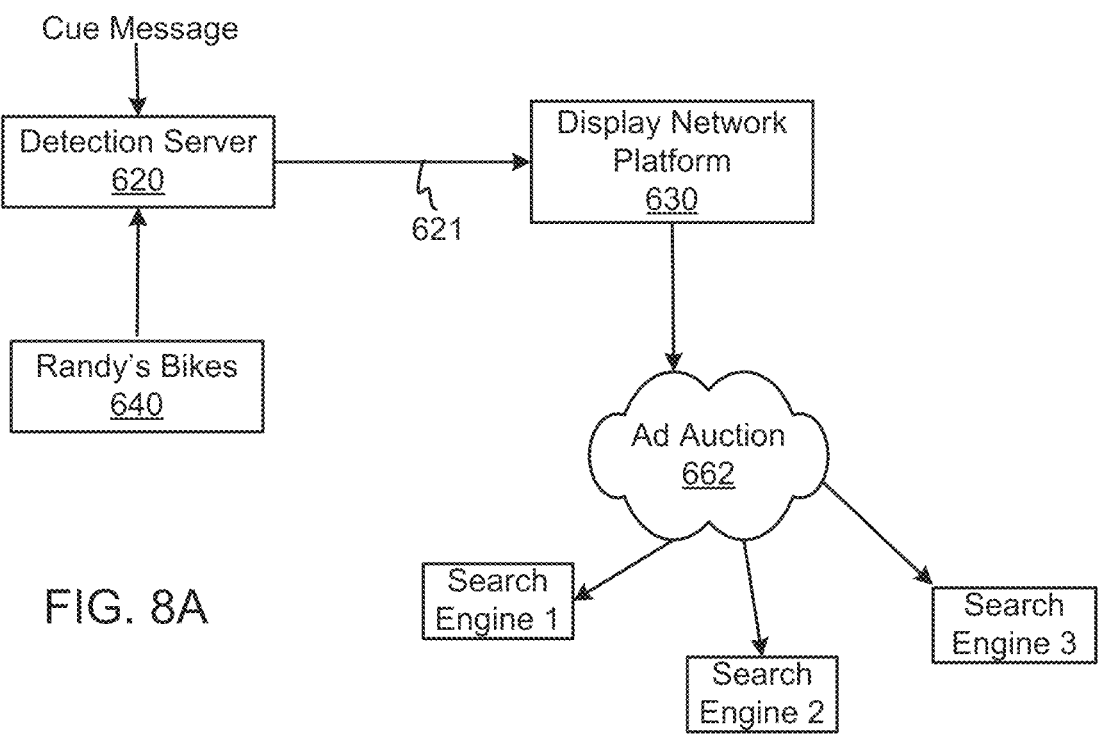
FIG. 8A is a block diagram illustrating a first system embodiment for triggering display ad cross-marketing.

The process for selection and placement of display ads is similar to the process for search engine marketing. In a first embodiment illustrated in FIG. 8A, the cue message is detected at the detection server 620, and a request 621 is prepared and sent to a display network platform 630. In this embodiment, the key information is included in the request 621 prepared by the detection server 620, and the display network platform 630 can use the key information to enter an auction 662 for display ads, similar to the auction for search engine ads. For example, Google runs separate auctions for search engine ads and display ads.

Thus, the request 622 includes (i) the targeting criteria on which to place bids (e.g., keywords, identified demographic, identified websites, etc.); (ii) the maximum bid per-click for each targeting criteria; (iii) a link to properly-formatted ad content associated with each targeting criterion; (iv) geolocation for the campaign; (v) duration of the campaign; (vi) landing page for linked inquiries, etc.

Figure 8B:
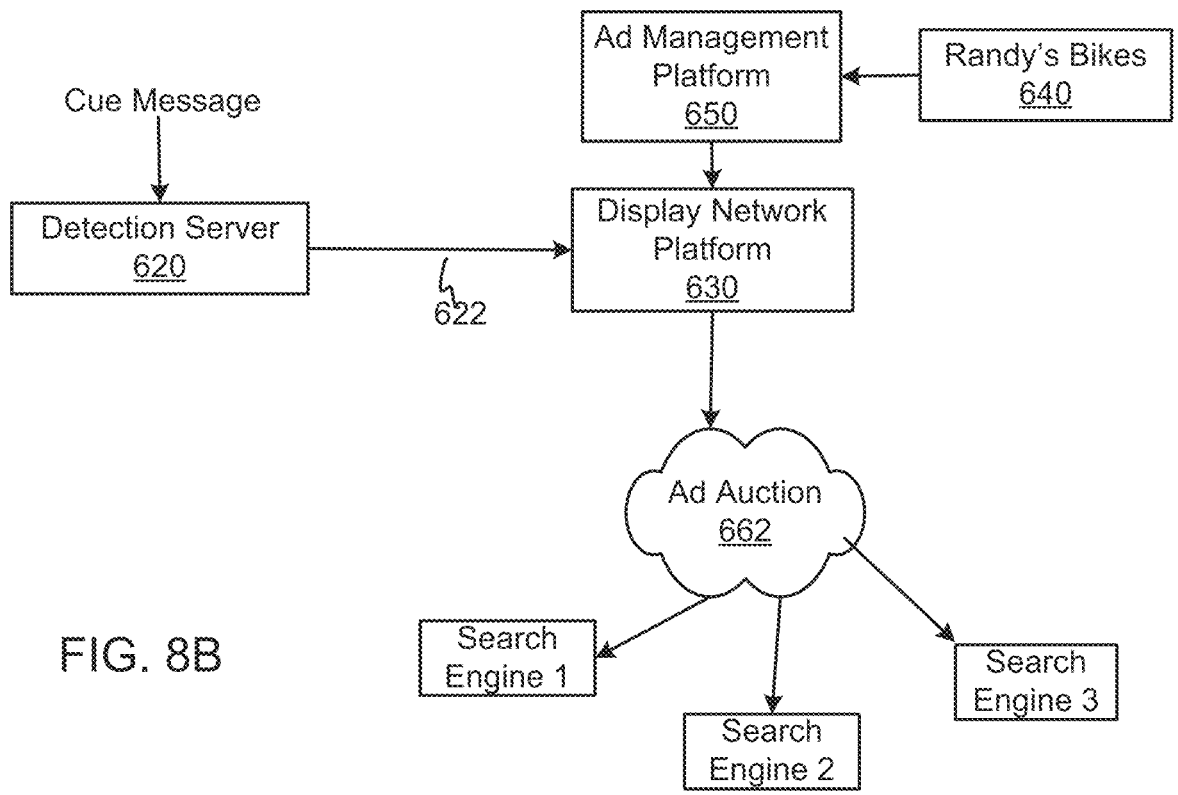
FIG. 8B is a block diagram illustrating a second system embodiment for triggering display ad cross-marketing.

In a second embodiment illustrated in FIG. 8B, the cue message is detected at the detection server 620, and a request 622 is prepared and sent to a display network platform 630. In this embodiment, the key information is in the hands of the display network platform 630 as a result of working with the advertiser 640, and more particularly, the ad management platform 650 that works with the advertiser. However, the detection server 620 is made aware that Randy's Bikes wants to run a companion ad, and therefore when the request 622 is prepared, it includes a flag that is set to indicate that a companion ad should be initiated, as described above, and a link to the key information at the display network platform 650 that is required to place the display ads. Thus, the display network platform 650 can act on the link to obtain the key information, and then proceed to the auction 662.

Email Marketing

Electronic mail ("email") is a well-known method for message exchange between user devices. A user/sender composes a message using an email client application installed on the user device, and the message may include text, images, and attachments. Assuming the user/sender is connected to an appropriate network, upon "sending" the email, the message is uploaded to an email server using the Simple Mail Transfer Protocol ("SMTP"). The email server communicates with the Domain Name Server ("DNS") to locate the recipient's email server, and when found, transfers the email to the recipient's email server, where it can be retrieved and read by the recipient.

The format of an email message, i.e., header and body, is also well-defined and is compatible with the Multipurpose Internet Mail Extensions ("MIME") standard. For example, the header portion is required to have a FROM field that includes the email address of the author and a DATE field that includes the local date and time when the message was composed. Many email message headers also contain other fields, such as a TO field that includes the email address(es) of the recipients, a SUBJECT field that includes a brief summary of the topic. The body portion typically allows either plain text or HTML at the user's option.

Thus, the key information to be provided in the request is a mailing list, a message body, and targeting information. With regard to the message body, the use of HTML is typically preferred for marketing messages as it allows the use of images, animation, different character sets, etc., that can provide a better visual and interactive experience for the targeted audience. With regard to a mailing list, many advertisers maintain their own email address lists, or buy email address lists that are targeted by age, gender, demographic, search history, etc.

Figure 9:
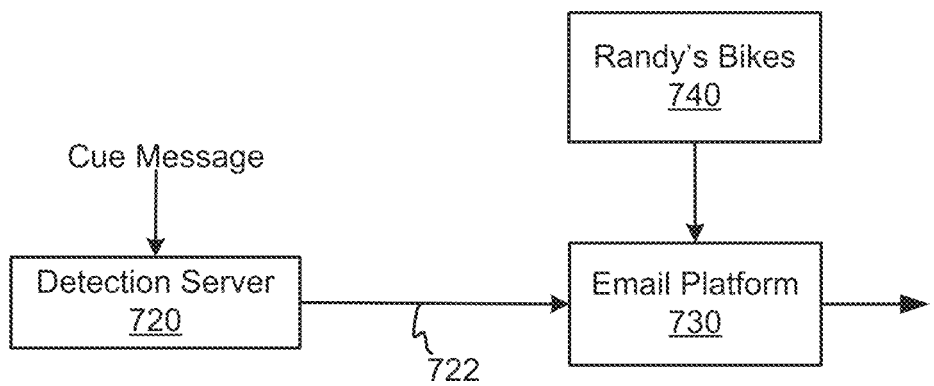
FIG. 9 is a block diagram illustrating a system for triggering email cross-marketing.

As in the previous examples the key information can be provided by the advertiser to the local server for inclusion in the request. However, the more typical scenario for email delivery is illustrated in FIG. 9, where the cue message is detected at the detection server 720, and a request 722 is prepared and sent to an email marketing platform 730. Since the detection server 720 has been made aware that Randy's Bikes wants to run a companion ad, a flag is included and set in request 722 to indicate that a companion ad should be initiated, and a link to the key information stored on the advertiser's data server 740 is provided so that the email platform 730 can act on the link to obtain the required key information, e.g., a mailing list, a message body, and targeting information. Once obtained, the key information is used by the email platform 730 to create and send a marketing email to the mailing list.

In light of the modern trend toward more personalization of marketing messages, one advantage of interacting with the linear programming ad insertion system is that actual viewing information can be obtained from the STBs and that information used to specifically target customers that were tuned to the National Geographic broadcast. MVPDs and/or third party platforms routinely collect such information and can make it available to the detection server or the action server.

Text Message Marketing

Text messaging, or simply messaging or texting, is also a method of message exchange between two devices having many similarities to email, but is limited in size and content. Messaging is most popular for mobile devices. For example, a user/sender composes a message using a client application installed on the user device, adds one or more telephone numbers in the TO field, and presses the send button. The message is converted to a radio frequency signal, then uploaded to a server/gateway device, which transmits the signal to the nearest cell tower. The signal is forwarded on to other cell towers until it reaches one that is proximate to the recipient's location, and the message is then delivered to the recipient's device when the device is powered on.

Message formatting has several standard forms, and each device is configured to handle any of the several formats. Short Messaging Service ("SMS") is the most basic format for messaging and supports plain text only. Enhanced Messaging Service allows for formatted text, sounds, small pictures and icons. Multimedia Messaging Service ("MMS") allows for animations, audio and video files.

Figure 10:
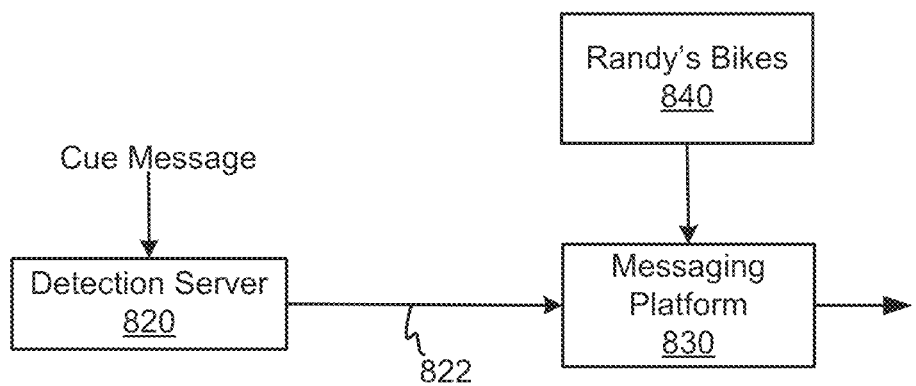
FIG. 10 is a block diagram illustrating a system for triggering messaging cross-marketing.

The key information to be provided in the request is a list of numbers, message content, and targeting information. Once again, the key information can be provided by the advertiser to the local server for inclusion in the request. However, more typically, as shown in FIG. 10, the cue message is detected at the detection server 820, and a request 822 is prepared and sent to a message marketing platform 830. The detection server 820 has been made aware that Randy's Bikes wants to run a companion ad, and a flag is included and set in request 822 to indicate that a companion ad should be initiated, and a link to the key information for the companion ad, stored on the advertiser's data server 840, is provided to the message marketing platform 830 so the link can be acted on to obtain the required key information, e.g., a mailing list, a message body, and targeting information. Once obtained, the key information is used by the message marketing platform 830 to create and send a marketing message to the numbers on the telephone list.

Robo-Calls

Figure 11:
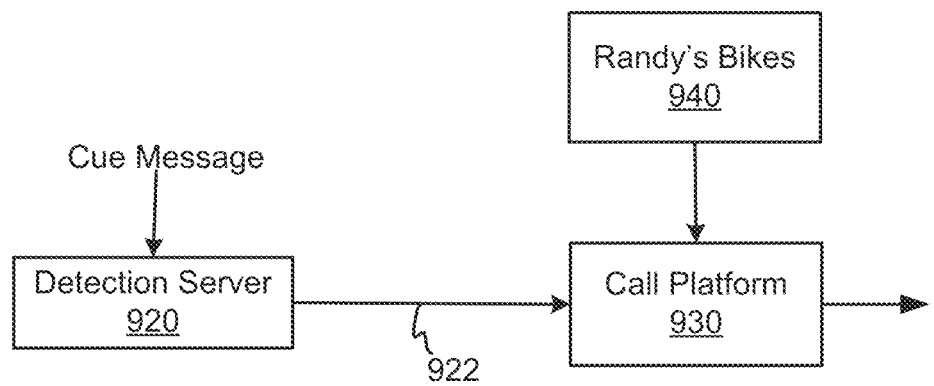
FIG. 11 is a block diagram illustrating a system for triggering robo-call cross-marketing.

"Robo-calling" is a method of mass communication where a prerecorded message is delivered to a list of telephone numbers. This method is much like messaging, in that the key information to be provided in the request is a list of numbers, and the pre-recorded message such as an audio file. As shown in FIG. 11, the cue message is detected at the detection server 920, and a request 922 is prepared and sent to call marketing platform 930. The detection server 920 has been made aware that Randy's Bikes wants to run a companion ad, and a flag is included and set in request 922 to indicate that a companion ad should be initiated, in this instance, a robo-call campaign. The audio file and the list of numbers are provided by the advertiser 940 to the call marketing platform 930. Once obtained, the call marketing platform 930 can call each number on the, and when the line is answered, the audio file is played.

IoT Marketing

The Internet of Things ("IoT") extends the idea of network connected devices to many common physical things, such as home appliances, vehicles, wearable devices. These devices are now digital, computer-based devices, which may be accessed using appropriate communication protocols. Conventional network protocols, such as WiFi, Bluetooth, Device-to-Device ("D2D"), and others provide ready connectivity to IoT devices. Further, applications can be built using the APIs or frameworks for such devices that are also readily available. For example, the AppleWatch® is a wrist-worn device that can accessed by developers using the WatchKit framework made available at the following link: <https://developer.apple.com/documentation/watchkit>. Similarly, numerous different "skills" can be programmed in the Amazon Alexa® virtual assistant by using the Alexa Skills Kit, described at the following link: <https://developer.amazon.com/alexa-skills-kit>. One caveat is that some devices may be resource limited, with little memory and low-performance CPUs such that interact with such devices is necessarily limited.

Figure 12:
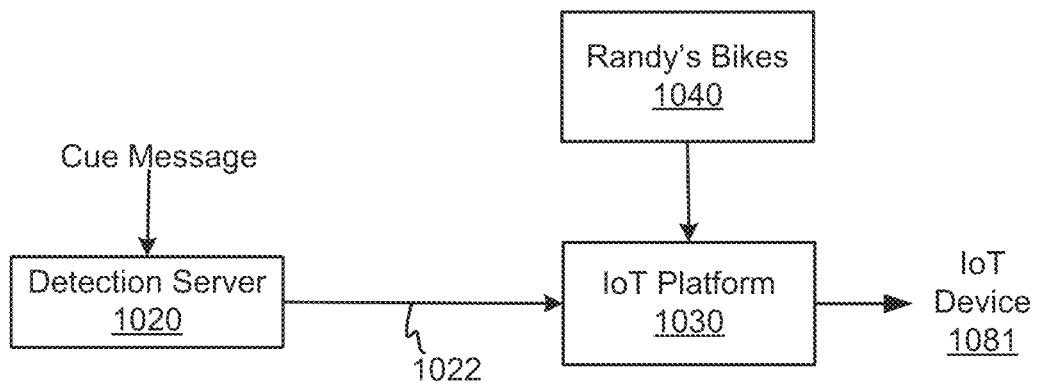
FIG. 12 is a block diagram illustrating a system for triggering IoT cross-marketing.

Once again, however, there are a number of third-party service providers that are developing the skills and applications necessary to interact with various other physical devices in the IoT environment. Thus, FIG. 12 illustrates a possible scenario for delivering a digital ad to an IoT device. The cue message is detected by a detection server 1020, and a request 1022 is generated and sent to an IoT ad platform 1030. The request 1022 includes a flag set to indicate that a companion ad should be initiated, as well as one or more links to advertiser information 1040. The advertiser information 1040 includes a specific targeted device 1081 and the message to be delivered. The IoT platform 1030 formats the message in the proper way for the targeted device and delivers the message to be displayed to the IoT device 1081.

Bidding and Pricing Impact of Cue Message Trigger

As mentioned above, digital ads are often selected for placement through an auction process. For example, when a user visits a website or enters a search request, the website's SSP initiates an auction to solicit bids for ads to serve on a web page in response to the user request. The request for bids typically includes user data, such as browsing history, demographic information, page requested, location, etc., and is sent to an ad exchange, which in turn submits the bid request to multiple DSPs, who automatically reply with relevant bids in real time. The SSP selects the successful bidder (according to its own criteria) and the advertiser's ad is served into the subject ad impression on the web page displayed to the user.

Similarly, digital ads are typically priced on a cost-per-impression (CPM) basis, meaning the advertiser is charged some small amount every time a user is exposed to an ad. Another common currency is cost-per-click (CPC), meaning the user is exposed to the impression for free and the advertiser only pays a small amount when the user clicks on the advertiser's ad in a particular digital medium. However, because the availability of companion ads triggered by a cue message as described above provides additional marketing opportunities for local advertisers in particular, the pricing structure imposed upon the selected advertiser may be adjusted to impose a premium for those opportunities. For example, the advertising partner, e.g., the action server or related network, may pay a referral fee to the detection server as an upcharge on the CPM or CPC for ads that were triggered by detection of a cue message. Accounting for such referrals may be based on a trust but verify honor system, but an accounting notice may also be generated when a companion ad is run in the selected digital channel.

Other examples of pricing methods include: imposing a volume-based fee based on impressions served or revenue earned; receiving a share of the ad revenue; imposing a flat technology fee based on the number of triggers initiated from cue messages, or the number of users, or any other reasonable methodology. The bottom line is that the detection server may be fairly compensated for initiating cross-channel marketing efforts based on cue message detection.

Alternative Triggering from On-Demand Programming

Consumers are increasingly changing their habits from viewing linear TV programming to watching on-demand, non-linear TV programming. However, the scenario is generally the same as described above for linear programming as many of these programs still have embedded cue messages in order to trigger advertising. Thus, a cue message embedded in a non-linear program stream can also be used to trigger cross-channel and IOT advertising on other devices and channels using all the operating modes described above. The difference in this mode of operation is that that the on-demand program is requested by the user for individual delivery to the user's set top box, instead of a general distribution by the MVPD to all set top boxes in the local area.

Figure 13:
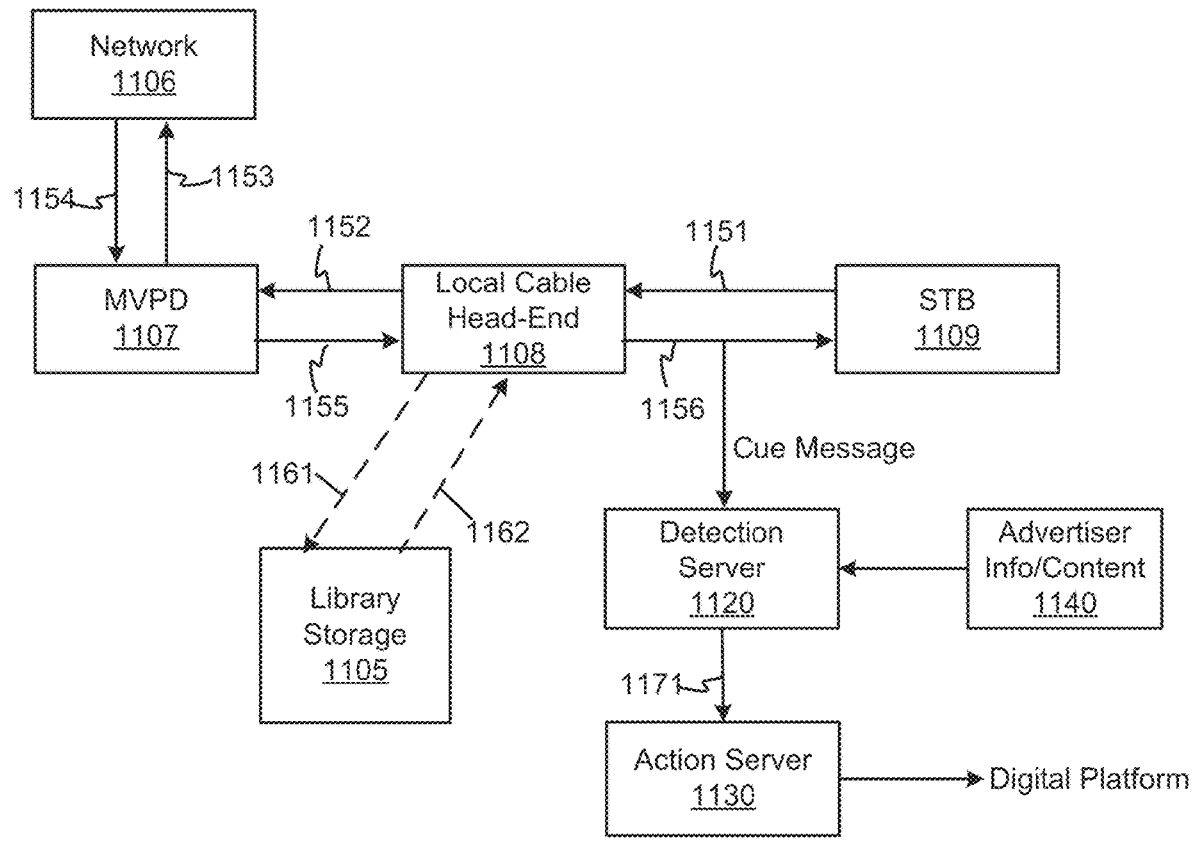
FIG. 13 is a block diagram illustrating a system for digital cross-marketing based on detection of a cue message in a non-linear programming stream.

FIG. 13 illustrates a typical example for request and delivery of on-demand video content. The request 1151 for a particular program is originated from the user through set top box 1109 and sent to the local head-end 1108 of the user's cable company. The local head-end 1108 forwards request 1152 to the MVPD 1107, which in turns sends request 1153 to the network 1106. The network 1106 returns the requested content to MVPD 1107 in response 1154, which is sent in response 1155 to the local head-end 1108 and then delivered to the user's set top box 1109 as response 1156.

Alternatively, the requested content may be available to the local head-end 1108 from library storage 1105, through request 1161 and response 1162, with the content delivered to the user's set top box in response 1156.

Thus, response 1156 is the programming feed, and a detection server 1120 is configured to monitor the programming feed in order to detect cue messages in the programming feed. Once a cue message is detected, the detection server 120 generates a request 1171 for a cross-marketing action and described throughout this disclosure and sends the request to action server 1130 for handling. The request 1171 includes data from the advertiser 1140 and passed on to the action server 1130, including the ad content or a link to the ad content.

CONCLUSION

The foregoing description has been presented for the purpose of illustration and description. It is not intended to be exhaustive or to limit the disclosure to the precise form disclosed. Many modifications and variations are possible in light of the above teachings. It is intended that the scope not be limited by this detailed description, but by the claims and the equivalents to the claims appended hereto.

The invention claimed is:

1. A method, comprising:
 detecting by a first server a cue message in a linear programming feed, the cue message and at least one associated data set having a plurality of ad insertion parameters for an upcoming ad insertion break in the linear programming feed, the ad insertion parameters including: a time and a duration of the ad insertion break; a network that is broadcasting the linear programming feed; a current program being broadcast on the linear programming feed; a geolocation for the linear programming feed; and a link to demographic and psychographic information for viewers of the current program;
 in response to detection of the cue message, generating by the first server a companion ad request for a companion ad in a digital channel, the companion ad request having first data including at least some of the plurality of ad insertion parameters, and second data that includes instructions for selecting the digital channel and for obtaining ad content in a proper format for the selected digital channel;

by the first server, sending the companion ad request to an ad management platform;

at the first server, receiving from the ad management platform, a confirmation notice that, in response to the companion ad request, at least one companion ad was run in the selected digital channel.

2. The method of claim 1, further comprising the selected digital channel is a search engine platform; and the second data includes a plurality of keywords; a maximum bid amount for purchase of each of the plurality of keywords on the search engine platform; and a link to properly formatted ad content for the search engine platform.

3. The method of claim 2, the second data further includes a defined geolocation for an ad campaign, and a duration of the ad campaign, and a landing page for resolving a link in the properly formatted ad content for user inquiries.

4. The method of claim 1, further comprising the selected digital channel is a display ad platform; and the second data includes targeting criteria on which to place bids, a maximum bid amount for each targeting criteria, and a link to properly-formatted ad content associated with each targeting criterion.

5. The method of claim 4, the second data information further includes a defined geolocation for ad campaign, a duration of the ad campaign, and a landing page for resolving a link in the properly formatted ad content for user inquiries.

6. The method of claim 4, the targeting criteria is one of keyword targeting, demographic targeting, placement targeting, topic targeting, interest targeting, or audience targeting.

7. The method of claim 1, further comprising the selected digital channel is an email platform; and the second data includes a mailing list, a message body, and targeting information.

8. The method of claim 1, further comprising the selected digital channel is a messaging platform; and the second data includes a list of telephone numbers, message content, and targeting information.

9. The method of claim 1, further comprising:

determining by the first server that an advertiser, identified in a response to the linear programming feed, has requested a companion ad be run in a digital channel; and obtaining a link to the ad content.

10. The method of claim 1, further comprising:

upon the first server receiving the confirmation notice that at least one companion ad was run in the selected digital channel, receiving by the first server compensation for generating and sending the companion ad request.

11. A method, comprising:

detecting by a first server a cue message in a linear programming feed, the cue message and at least one associated data set having a plurality of ad insertion parameters for an upcoming ad insertion break in the linear programming feed, the ad insertion parameters including a time and a duration of the ad insertion break; a network that is broadcasting the linear programming feed; a current program being broadcast on the linear programming feed; a geolocation for the linear programming feed; and a link to demographic and psychographic information for viewers of the current program;

in response to detection of the cue message, obtaining by the first server an ad to be placed in the upcoming ad insertion break;

based upon the obtained ad, determining by the first server an advertiser associated with the obtained ad;

based upon the obtained ad and the determined advertiser, generating by the first server a companion ad request for a companion ad to be run in a digital channel, the companion ad request including first data concerning the obtained ad; second data concerning the determined advertiser; at least some of the plurality of ad insertion parameters; a plurality of keywords; for each keyword, a maximum bid amount for purchase of each of the plurality of keywords on the search engine platform; and instructions for obtaining ad content in a proper format for the search engine platform;

by the first server, sending the companion ad request to an ad management platform; and at the first server, receiving from the ad management platform, a confirmation notice that, in response to the companion ad request, at least one of the companion ad request keywords were purchased and that a companion ad was placed on the search engine platform.

12. The method of claim 11, the companion ad request further including a defined geolocation for an ad campaign, a duration of the ad campaign, and a landing page for resolving a link in the properly formatted ad content for user inquiries.

13. A system, comprising:

a first server configured with program instructions that enable:

detecting a cue message in a linear programming feed, the cue message and at least one associated data set having a plurality of ad insertion parameters for an upcoming ad insertion break in the linear programming feed, the ad insertion parameters including a time and a duration of the ad insertion break; a network that is broadcasting the linear programming feed; a current program being broadcast on the linear programming feed; a geolocation for the linear programming feed; and a link to demographic and psychographic information for viewers of the current program;

generating a companion ad request for a companion ad to be run in a digital channel, the companion ad request having first data including at least some of the ad insertion parameters, and second data that includes instructions for selecting the digital channel and for obtaining ad content in a proper format for the selected digital channel;

sending the companion ad request to an ad management platform; and receiving from the ad management platform a confirmation notice that, in response to the companion ad request, at least one companion ad was run in the selected digital channel.

14. The system of claim 13, further comprising the selected digital channel is a search engine platform; and the second data includes a plurality of keywords; for each keyword, a maximum bid amount for purchase of each of the plurality of keywords on the search engine platform; and a link to properly formatted ad content for the search engine platform.

15. The system of claim 14, the second data further includes a defined geolocation for an ad campaign, a duration of the ad campaign, and a landing page for resolving a link in the properly formatted ad content for user inquiries.

16. The system of claim 13, further comprising
the selected digital channel is a display ad platform; and
the second data includes targeting criteria on which to place bids, the maximum bid per-click for each targeting criteria, and a link to properly-formatted ad content associated with each targeting criterion.

17. The system of claim 16, the second data further includes a defined geolocation for an ad campaign, a duration of the ad campaign, and a landing page for resolving a link in the properly formatted ad content for user inquiries.

18. The system of claim 16, the targeting criteria is one of keyword targeting, demographic targeting, placement targeting, topic targeting, interest targeting, or audience targeting.

19. The system of claim 13, further comprising
the selected digital channel is an email platform; and
the second data includes a mailing list, a message body, and targeting information.

20. The system of claim 13, further comprising
the selected digital channel is a messaging platform; and
the second data includes a list of telephone numbers, message content, and targeting information.

21. The system of claim 13, further comprising
the selected digital channel is an IoT platform; and
the second data includes information to identify and access a targeted device, and a properly formatted message.

22. The system of claim 13, the program instructions further including:
upon receiving the confirmation notice that at least one companion ad was run in the selected digital channel, receiving by the first server compensation for generating and sending the companion ad request.

23. A method, comprising:
detecting by a first server a cue message in a non-linear programming feed, the cue message and at least one associated data set having a plurality of ad insertion parameters for an upcoming ad insertion break in the non-linear programming feed, the ad insertion parameters including a location and a duration of the ad insertion break in the non-linear programming feed; a current program being streamed on the non-linear programming feed; a geolocation for the non-linear programming feed; and a link to demographic and psychographic information for viewers of the current program;
in response to detection of the cue message,
generating by the first server a companion ad request for a companion ad in a digital channel, the companion ad request having first data including at least some of the plurality of ad insertion parameters, and second data that includes instructions for selecting the digital channel and for obtaining ad content in a proper format for the selected digital channel;
by the first server, sending the companion ad request to an ad management platform;
at the first server, receiving from the ad management platform, a confirmation notice that, in response to the companion ad request, at least one companion ad was run in the selected digital channel.

* * * * *